Figure 3:
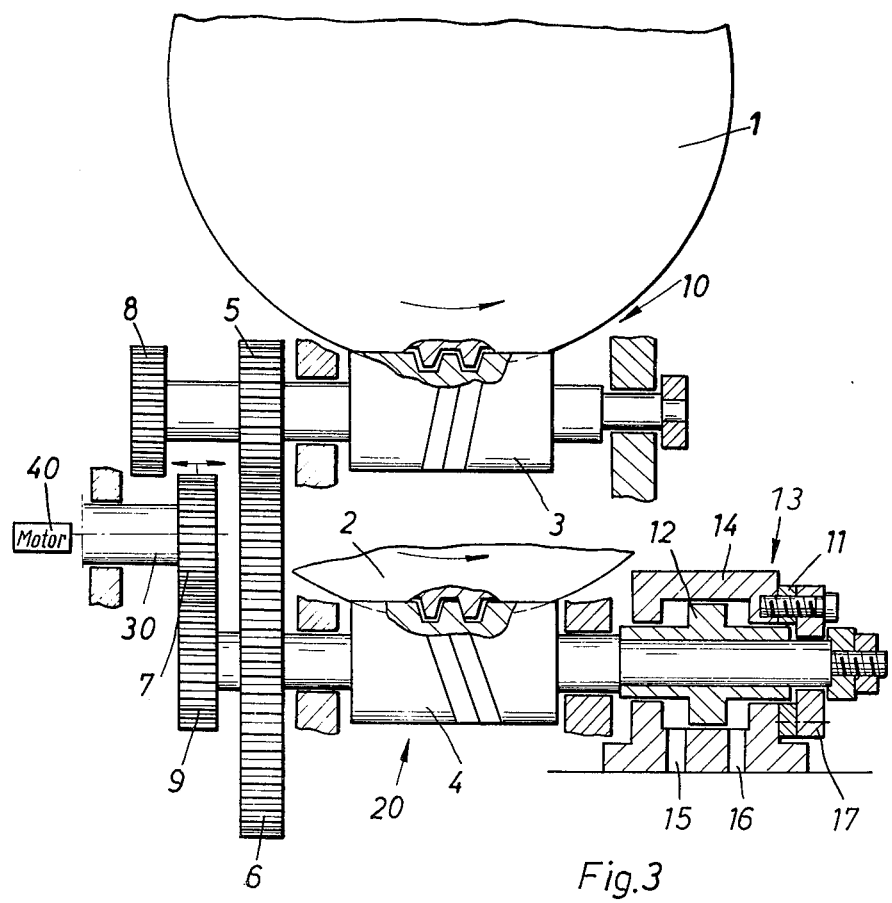

United States Patent [19]

Baumann et al.

[11] 4,286,479
[45] Sep. 1, 1981

[54] DRIVE SYSTEM FOR A WORKPIECE TABLE OF A MACHINE TOOL

[75] Inventors: Erich Baumann, Ludwigsburg; Hans-Peter Mente, Hochberg; Wolfgang Müller, Ludwigsburg, all of Fed. Rep. of Germany

[73] Assignee: Hermann Pfauter, Ludwigsburg, Fed. Rep. of Germany

[21] Appl. No.: 914,494

[22] Filed: Jun. 12, 1978

[30] Foreign Application Priority Data

Jun. 11, 1977 [DE] Fed. Rep. of Germany ....... 2726469

[51] Int. Cl.³ ............................................ F16H 37/06
[52] U.S. Cl. .................................. 74/724; 74/665 G; 74/665 GD; 74/664
[58] Field of Search ..................... 74/849, 670, 665 E, 74/665 G, 665 GD, 665 Q, 664, 425, 724

[56] References Cited

U.S. PATENT DOCUMENTS

| | | | |
|---|---|---|---|
| 2,163,035 | 6/1939 | Grupe | 74/665 GD |
| 2,195,911 | 4/1940 | Zimmermann | 74/724 |
| 2,474,726 | 6/1949 | De La Source | 74/670 |
| 2,615,679 | 10/1952 | Menhall | 74/664 X |
| 3,088,334 | 5/1963 | Richardson | 74/664 |
| 3,191,454 | 6/1965 | Holzer | 74/849 |

FOREIGN PATENT DOCUMENTS 45-35111 of 1970 Japan ........................................ 74/425

*Primary Examiner*—Andrew V. Kundrat
*Attorney, Agent, or Firm*—Becker & Becker, Inc.

[57] ABSTRACT

A drive system for a workpiece table of a machine tool, especially a gear cutting machine, which includes two worm wheel drives of different transmission ratio, each worm wheel drive including a worm and a worm wheel. The worms of the worm wheel drives being adapted alternately to be drivingly connected to a drive shaft. The worms of the worm wheel drives are drivingly connected to each other while the transmission ratio of this transmission connection of the two worms equals the reciprocal transmission ratio of the worm wheel drives with regard to each other. The worm wheels of both worm wheel drives which are rotated in the same direction and at equal speed which latter depends on the respective coupled worm wheel drive, are coupled to each other as well as to the workpiece table.

6 Claims, 3 Drawing Figures

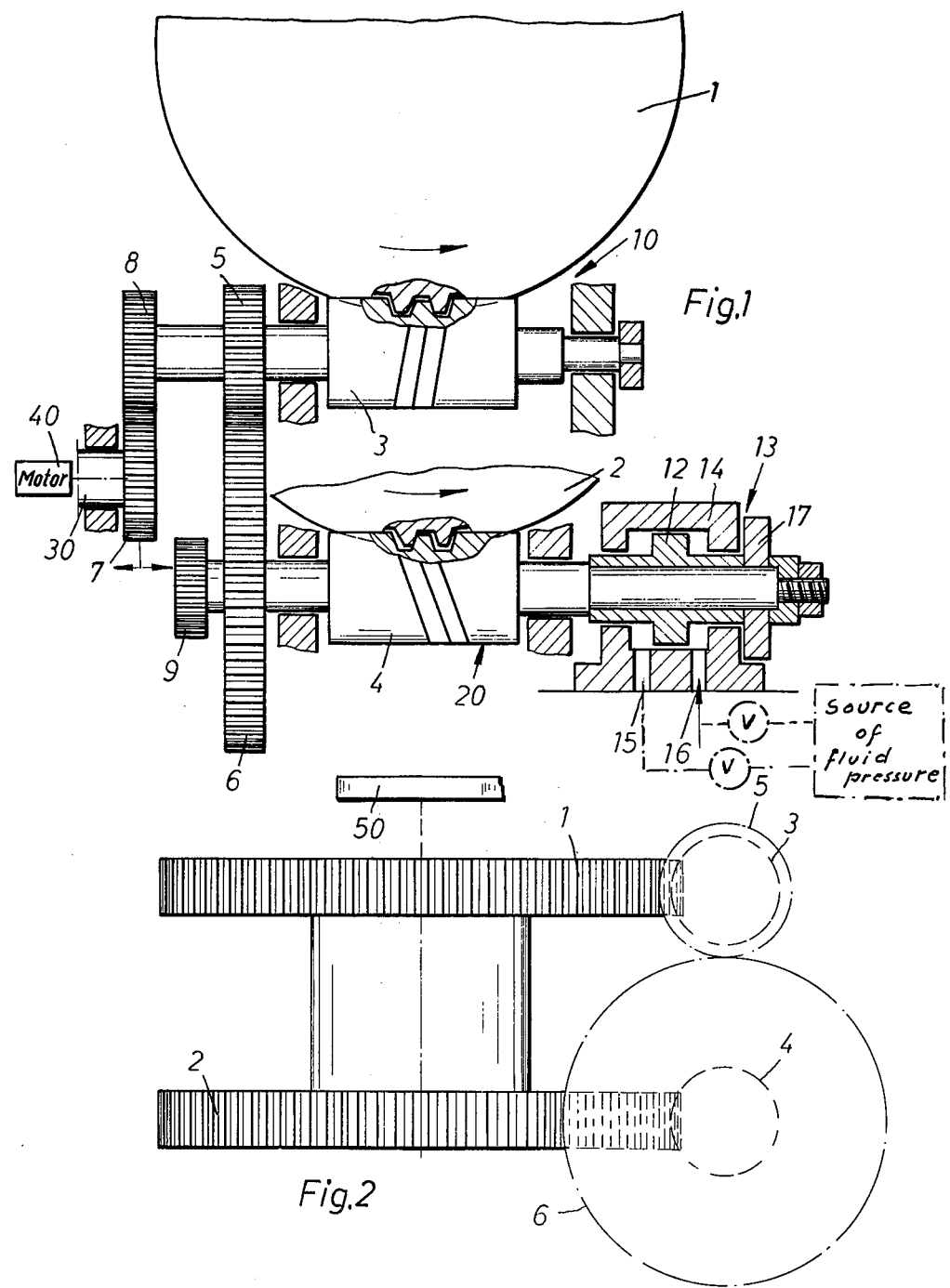

DRIVE SYSTEM FOR A WORKPIECE TABLE OF A MACHINE TOOL

The present invention relates to a driving device for a workpiece table of a machine tool, especially of a gear-cutting machine. Customarily, the drive of a workpiece table of a gear cutting machine is effected by a worm wheel drive comprising a worm and a worm wheel. Withe the previously known embodiment of such a driving device, two worms mesh with one worm wheel. The worms due to their common engagement with one flank of the worm wheel simultaneously transfer the required torque upon the workpiece table or by elastically pressing one worm only against the counter flank in the respective dividing gear assure the necessary play or freedom. The same possibilities are also available with a worm transmission comprising two worm wheels and two worms.

Especially for large hobbing machines, driving devices for the workpiece table have become known which comprise two worm drives with different transmission ratio in order to be able to drive the workpiece table selectively at a lower or higher transmission ratio or at a higher or lower speed. With these known driving devices, only the respective desired worm wheel drive is engaged while prior thereto the other worm wheel drive, by means of suitable devices and conversion has been disenaged. With transmissions having extremely high precision, as they are necessary for the table drive of a hobbing machine, it is necessary by mechanical or electrical blocking devices to prevent the worm wheel drive from being damaged when it is being engaged. Furthermore, the connection of the driving shaft with the respective worm of the worm wheel drive to be engaged or disengaged requires extreme precision and care.

It is, therefore, an object of the present invention to provide a driving device of the above mentioned general type which will make possible the shifting over from one worm wheel drive to the other worm wheel drive in a more simple and faster way then heretofore possible. A further object of the present invention consists in that in addition to the simpler and faster shiftover possibility, a play-free driving device will be assured at lower speeds of the workpiece table and also an undue heatingup at higher speeds of the workpiece table will be avoided.

These and other objects and advantages of the invention will appear more clearly from the following specification in connection with the accompanying drawings, in which:

FIG. 1 illustrates a section through the driving device according to the invention in which one worm wheel drive which has the higher transmission ratio is in engagement.

FIG. 2 diagrammatically shows a side view of the driving device according to FIG. 1.

FIG. 3 diagrammatically illustrates a section through the driving device according to the invention, in which the other worm wheel drive which has the lower transmission ratio is engaged.

The driving device according to the present invention for a workpiece table of a machine tool, especially gear cutting machine, is characterized primarily in that the worms of the two worm wheel drives are operatively connected to each other while the transmission ratio of this driving connection of the two worms equals the reciprocal transmission ratio of the worm wheel drives relative to each other, and is furthermore characterized in that the worm wheels of both worm wheel drives which are moved in the same direction at identical speed depending on the respective coupled worm wheel drive, are coupled to each other as well as to the workpiece table.

Referring now to the drawings in detail, the driving device illustrated in FIG. 1 primarily comprises the two worm wheel drives 10 and 20 which are adapted alternately to be brought into engagement with the drive shaft 30 of a motor 40 indicated only diagrammatically. One worm wheel drive 10 has a greater transmission ratio than the other worm wheel drive 20 so that a workpiece table 50 (FIG. 2) coupled to the two worm wheel drives 10 and 20 is adapted to be rotated at two different speeds of rotation. The coupling between the worm wheel drives 10 and 20 with the workpiece table 50 is for the sake of simplicity indicated in FIG. 2 merely by a dash line.

It is, of course, to be understood that a person skilled in this field will, depending on the type of workpiece table 50, provide a suitable connection between the two worm wheel drives 10 and 20 and the workpiece table 50.

The worm wheel drive 10 comprises a worm 3 journalled at both ends. The worm 3 meshes with a worm wheel 1 and for the sake of simplicity is shown in FIG. 1 moved or turned by 90° into the drawing plane. The worm wheel drive 20 likewise comprises a worm 4 journalled at both ends, which meshes with a worm wheel 2 likewise turned by 90° into the drawing plane. That end of each worm 3 and 4 which faces the driving shaft 30 carries two spur gears 5,8 and 6,9 respectively which are provided in axially spaced arrangement, while the spur gear 5 of worm 3 meshes with the spur gear 6 of worm 4.

As will be seen from FIG. 1, the axial spacing between the spur gears 5 and 8 of worm 3 is greater than the axial distance between the spur gears 6 and 9 of worm 4 so that the spur gears 8 and 9 are respectively located in two different planes. According to the engagement illustrated in FIG. 1, the spur gear 8 of worm 3 meshes with the pinion 7 at the end of the drive shaft 30. The pinion 7 is adapted by axial displacement of the drive shaft 30 toward the right, to be disengaged from the spur gear 8 of worm 3 and to be brought into meshing engagement with the spur gear 9 of worm 4 as shown in FIG. 3. An important requirement for this shifting over from one worm wheel drive 10 to the other worm wheel drive 20 consists in the selection of the transmission ratio between the two spur gears 5 and 6 always meshing with each other, in such a way that this ratio will correspond to the reciprocal value of the transmission ratio of the two worm wheel drives 10 and 20 with regard to each other. If for instance the worm wheel drive 10 has a transmission ratio of 4:1 and the worm wheel drive 20 has a transmission ratio of 2:1, the transmission ratio of the teeth on the spur gears 5 and 6 is selected as transmission ratio 1:2, which means that the diameter of the spur gear 6 equals twice the diameter of the spur gear 5. With this dimensioning instruction, it will be assured that the two worm wheels 1 and 2 will always have the same speed, the respective value of which depends on which of the worms 3 and 4 through their associated spur gear 8 or 9 is in meshing engagement with the pinion 7.

While that end of the worm 3 which faces away from the drive shaft 30 is, as shown in FIGS. 1 and 3, secured against an axial displacement, the respective end of worm 4 is connected to the piston 12 of a pressure medium actuated device 13, hydraulic medium. The device 13 with its cylinder 14 particularly operable with a nondisplaceably mounted, whereas the worm 4 is displaceably arranged and, therefore, by an axial displacement of piston 12, the worm 4 can be adjusted in either axial direction. In the cylinder housing 14 of the pressure medium actuated device 13, there are provided two pressure medium passages 15, 16 for connection with a non-illustrated source of pressure, said passages 15, 16 respectively leading to an end face of piston 12.

In the feeding lines between the passages 15 and 16 and the non-illustrated source of fluid pressure, control devices such as valves, flaps, or the like may be provided which are controlled by a central control logic of the machine tool. For purposes of limiting the piston stroke, it is possible, as shown in FIG. 3, at the outside of the cylinder housing 14 to provide an adjustable abutment 11 which operates against an abutment plate 17 shown in FIG. 1. The control of the pressure fluid actuated device 13 is effected in the following manner. When coupling the drive shaft 30 to the worm wheel drive 10 with the higher transmission ratio, the worm 4 is pressed by a corresponding adjustment of piston 12 against a tooth flank of the associated worm wheel 2 whereby the worm wheel 1 coupled to the worm wheel 2 through the intervention of the workpiece table 50 (FIG. 2) is pressed against the flank of the worm 3 associated therewith. With coupled-on condition or engaged relationship of the worm (4 or 3) and worm wheel (2 or 1), respectively, the worm wheel drive 10 at low speeds of rotation or advancing speed of the workpiece table 50, has the play or freedom thereof assured.

With the drive shaft 30 coupled to the worm wheel drive 20 (FIG. 3), at the lower transmission ratio, the worm 3 by a corresponding adjustment of piston 12 is disengaged from the tooth flanks of the associated worm wheel 1. This position is obtained when the plate 17 engages the abutment 11 of the device 13. In this position, the worm 3 runs idle without tooth contact, whereby an undue heating-up of the worm wheel drive 20 in view of high sliding speed of the worm flank on the flanks of the worm wheel will be avoided. For realizing this object, the gear play with the worm wheel drive 10 is selected greater than with the worm wheel drive 20.

It may furthermore be mentioned that the arrows in FIGS. 1 and 2 indicate the direction of rotation of the associated gear. As will be seen therefrom, the gears of the gear pairs 7,8 and 7,9 and 5,6 move in opposite direction with regard to each other similar to the worms 3 and 4 on the same shafts as said gears. In view of the opposite direction of rotation of the worms 3 and 4, the worm wheels 1 and 2 move in the same direction.

As will be seen from the above, the driving device according to the present invention makes it possible without expensive changeover operations to select the driving speed of the workpiece table of a machine tool, especially a gear cutting machine such as a hobbing machine, in a simple and fast way. If the invention is to be utilized in connection with a hobbing machine, it is possible by means of the driving device according to the invention, for instance spur gears, to rough cut at higher table speed by means of multiple hobs, while the worm wheel drive with the higher transmission ratio is disengaged so that it will not be affected by the heavier cuts. Subsequently, by shifting over to the worm wheel drive with the higher transmission ratio, it is possible to cut with single hobs in order to obtain the required precision.

It is, of course, to be understood that the present invention is by no means limited to the specific showing in the drawings, but also comprises any modifications within the scope of the appended claims.

What we claim is:

1. In combination with a workpiece table of a machine tool, especially of a gear cutting machine, a drive system for said workpiece table stressed free and independent of play with stiffness and rigidity at table turning speeds, which includes: a drive shaft drivingly connectable to a motor, two worm wheel drives of different transmission ratio, each of said worm wheel drives comprising a worm and a worm wheel engageable so as to be stressed free of play at lower speeds, the worms of said worm wheel drives being connected to each other and drivingly connectable to said drive shaft while the transmission ratio of said drivingly interconnected worms equals the reciprocal transmission ratio of said worm wheel drives with regard to each other, the worm wheels of said two worm wheel drives being normally coupled to each other and to said workpiece table and being rotatable in the same direction and at equal speed the latter being dependent on the respective coupled worm wheel drive under stress of play-free driving assured at lower speeds of the workpiece table and also avoiding undue heating-up at higher speeds of the workpiece table.

2. The combination according to claim 1, in which that worm of said two worm wheel drives which has the lowest transmission ratio is axially displaceable, and in which the back lash with that worm wheel drive which has a greater transmission ratio than the other worm wheel drive is greater than the back lash of said other worm wheel drive play-free table stress.

3. The combination according to claim 2, which includes fluid operable means operatively connected to said axially displaceable worm both for axially displacing the same and for table stress.

4. The combination according to claim 3, in which said fluid operable means includes a hydraulically operable cylinder-piston device.

5. The combination according to claim 3, in which the worm wheel of said worm wheel drive with the greatest transmission ratio is is positively drivingly connected to the worm wheel drive with the axially displaceable worm through the worm wheel pertaining to said last mentioned worm wheel drive, and in which said fluid operable means is movable to a position in which in response to establishing driving connection between said drive shaft and that worm wheel drive which has the greatest transmission ratio, the worm wheel of said last mentioned worm wheel drive is pressed against a tooth flank of the pertaining worm.

6. The combination according to claim 3, in which the worm wheel of said worm wheel drive with the greatest transmission ratio is positively drivingly connected to the worm wheel drive with the axially displaceable worm through the worm wheel pertaining to said last mentioned worm wheel drive, and in which said fluid operable means is movable to a position in which in response to establishing driving connection between said drive shaft and that worm wheel drive which comprises said axially displaceable worm the worm wheel associated with the axially displaceable worm disengages the flanks of the latter while the worm wheel of said worm wheel drive with the greatest transmission ratio disengages the tooth flanks of the pertaining worm.

* * * * *